United States Patent
Zhao et al.

(10) Patent No.: US 12,482,039 B2
(45) Date of Patent: Nov. 25, 2025

(54) METHOD FOR REAL-TIME DATA COMMUNICATION, ELECTRONIC DEVICE, AND SYSTEM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Shaobei Chen, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 156 days.

(21) Appl. No.: 18/044,376

(22) PCT Filed: Sep. 6, 2021

(86) PCT No.: PCT/CN2021/116694
§ 371 (c)(1),
(2) Date: Mar. 7, 2023

(87) PCT Pub. No.: WO2022/052885
PCT Pub. Date: Mar. 17, 2022

(65) Prior Publication Data
US 2024/0029158 A1    Jan. 25, 2024

(30) Foreign Application Priority Data
Sep. 11, 2020  (CN) .......................... 202010958010.1

(51) Int. Cl.
*G06Q 40/04*    (2012.01)
*H04L 41/0896*  (2022.01)

(52) U.S. Cl.
CPC ......... *G06Q 40/04* (2013.01); *H04L 41/0896* (2013.01); *G06Q 2220/00* (2013.01)

(58) Field of Classification Search
CPC ..................................................... G06Q 40/04
(Continued)

(56) References Cited

U.S. PATENT DOCUMENTS 10,664,877 B1 * 5/2020 Feng ...................... H04L 9/3247
10,680,828 B2 * 6/2020 Qiu ........................ H04L 9/0637
(Continued)

FOREIGN PATENT DOCUMENTS

CA   3177645 A1 * 11/2022 .............. B25J 11/00
CN   107301536 A    10/2017
(Continued)

OTHER PUBLICATIONS

* Dylan Yaga et al. "Blockchain Technology Overview." (Oct. 2018). Retrieved online Apr. 24, 2025). https://nvlpubs.nist.gov/nistpubs/ir/2018/nist.ir.8202.pdf (Year: 2018).*
(Continued)

*Primary Examiner* — James A Reagan
(74) *Attorney, Agent, or Firm* — Kinney & Lange, P.A.

(57) ABSTRACT

A method for real-time data communication, an electronic device and a system are provided. A method for real-time data communication executed at an electronic device of a data receiver includes: publishing a resource pool contract to a blockchain network, the resource pool contract is configured to trigger an establishment of a resource pool including a first number of resources; establishing a data flow with each data provider corresponding to a second number of resources in the resource pool, the second number is less than the first number; and receiving real-time data transmitted by the data provider through the data flow.

15 Claims, 7 Drawing Sheets

(58) Field of Classification Search
USPC .......................................................... 705/50
See application file for complete search history.

(56) References Cited

U.S. PATENT DOCUMENTS

| | | | | |
|---|---|---|---|---|
| 10,896,436 | B1* | 1/2021 | Prendergast | G06Q 30/0276 |
| 11,132,707 | B2* | 9/2021 | Johnson | H04L 9/3236 |
| 2008/0259966 | A1* | 10/2008 | Baird | H04N 21/6332 |
| | | | | 370/503 |
| 2014/0344015 | A1* | 11/2014 | Puertolas-Montanes | |
| | | | | G06Q 30/0201 |
| | | | | 705/7.29 |
| 2017/0330159 | A1* | 11/2017 | Castinado | G06Q 20/02 |
| 2017/0359408 | A1* | 12/2017 | Kurian | H04L 47/72 |
| 2018/0077079 | A1* | 3/2018 | Walker | H04L 47/76 |
| 2018/0276626 | A1* | 9/2018 | Laiben | G06Q 20/3829 |
| 2019/0108362 | A1* | 4/2019 | Miller | G06F 21/60 |
| 2019/0138363 | A1* | 5/2019 | Reed | G06F 9/5027 |
| 2019/0333096 | A1* | 10/2019 | Johnson | H04L 63/123 |
| 2019/0347657 | A1 | 11/2019 | Guo et al. | |
| 2020/0052917 | A1* | 2/2020 | Corral | H04L 67/53 |
| 2020/0058023 | A1* | 2/2020 | Travizano | H04L 9/3239 |
| 2020/0076742 | A1* | 3/2020 | McDonald | H04L 47/39 |
| 2020/0177519 | A1* | 6/2020 | Zou | H04L 9/3239 |
| 2020/0366950 | A1* | 11/2020 | Manganilla | G06Q 20/405 |
| 2020/0374127 | A1* | 11/2020 | Wei-Kocsis | H04L 41/5019 |
| 2021/0117249 | A1* | 4/2021 | Doshi | H04L 67/1001 |

FOREIGN PATENT DOCUMENTS

| | | | | |
|---|---|---|---|---|
| CN | 108665261 | A | 10/2018 | |
| CN | 109035014 | A | 12/2018 | |
| CN | 109803004 | A | 5/2019 | |
| CN | 110335037 | A | 10/2019 | |
| CN | 111163132 | A | 5/2020 | |
| CN | 111402055 | A | 7/2020 | |
| CN | 112200570 | A * | 1/2021 | G06F 21/33 |
| EP | 3268905 | A4 * | 8/2018 | G06F 9/45558 |
| IN | 111061713 | A | 4/2020 | |
| JP | 2015519639 | A | 7/2015 | |
| JP | 2020077347 | A | 5/2020 | |
| JP | 2020086562 | A | 6/2020 | |
| WO | 2019218717 | A1 | 11/2019 | |

OTHER PUBLICATIONS

• Deloitte. "Applying blockchain in securitization: opportunities for reinvention." (Nov. 2016). Retrieved online Apr. 24, 2025. https://www2.deloitte.com/content/dam/Deloitte/us/Documents/regulatory/us-sfig-report-applying-blockchain-in-securitization-opportunities-for-reinvention.pdf (Year: 2016).*

• Fatf. "Virtual Assets and Virtual Asset Service Providers." (Jun. 2019). Retrieved online Apr. 24, 2025. https://www.fatf-gafi.org/content/dam/fatf-gafi/guidance/RBA-VA-VASPs.pdf (Year: 2019).*

First Chinese Office Action dated Dec. 27, 2022, for corresponding Chinese Application No. 202010958010.1.

International Search Report and Written Opinion dated Sep. 6, 2021, for corresponding PCT Application No. PCT/CN2021/116694.

Extended European Search Report and Written Opinion dated Sep. 10, 2024, for corresponding European Patent Application No. 21865939.9.

First Japanese Office Action dated May 27, 2025, for corresponding Japanese Patent Application No. 2023516216, 13 pgs.

* cited by examiner

700

```
┌─────────────────────────────────────┐
│ A resource pool contract is received from a │
│ blockchain network, wherein the resource    │
│ pool contract is configured to trigger an   │
│ establishment of a resource pool including  │ ← S710
│ a first number of resources, the resource   │
│ pool contract further specifies a second    │
│ number of resources expected to be          │
│ activated simultaneously in the resource    │
│ pool, and the second number is less than    │
│ the first number                            │
└─────────────────────────────────────┘
                    ↓
┌─────────────────────────────────────┐
│ A message, which indicates consent to be    │ ← S720
│ added to the resource pool, is transmitted to│
│ the blockchain network                      │
└─────────────────────────────────────┘
```

```
┌─────────────────────────────────────┐
│ A data flow contract is published to a blockchain │
│ network, wherein the data flow contract is        │
│ configured to trigger to add a data flow provided by│
│ a data provider to a resource pool as a resource, the│
│ resource pool is a resource pool including a first │
│ number of resources, an establishment of the      │ ← S810
│ resource pool is triggered by a resource pool     │
│ contract published by a data receiver, the resource│
│ pool contract further specifies a second number of│
│ resources expected to be activated simultaneously │
│ in the resource pool, and the second number is less│
│ than the first number                             │
└─────────────────────────────────────┘
                    ↓
┌─────────────────────────────────────┐
│ A message, which indicates that the data flow     │ ← S820
│ contract is added to the resource pool, is received│
│ from the blockchain network                       │
└─────────────────────────────────────┘
```

FIG. 8

METHOD FOR REAL-TIME DATA COMMUNICATION, ELECTRONIC DEVICE, AND SYSTEM

CROSS-REFERENCE TO RELATED APPLICATION(S)

This application is a Section 371 National Stage Application of International Application No. PCT/CN2021/116694, filed on Sep. 6, 2021, entitled "METHOD FOR REAL-TIME DATA COMMUNICATION, ELECTRONIC DEVICE, AND SYSTEM", which claims priority to Chinese Application No. 202010958010.1, filed on Sep. 11, 2020, the contents of which are incorporated herein by reference in their entireties.

TECHNICAL FIELD

The present disclosure relates to a field of communication, and more particularly to a method for real-time data communication, an electronic device and a system.

BACKGROUND

With a rapid development of communication technology, the Internet of Things (IoT) has received increasing attention. The IoT, that is, an "Internet of Everything Connected", is an extension and expansion network based on the Internet. It is a huge network formed by combining various information sensing devices (i.e., sensors) with the Internet, to achieve an interconnection of people, machines and things at anytime and anywhere.

According to the statistics of a market research report "State of the market: Internet of things 2016", a global IoT sensor market has exceeded 600 billion per year, including purchase, installation, maintenance of the sensor and a sensor interface software. A sensor owner may obtain more data through the sensor, and a service provider may also provide a value-added service based on the sensor data. With the development of 5G technology, a transmission of the sensor data is more convenient. The sensor data may be transmitted to a data receiver quickly and in real-time.

Therefore, a consensus that the future is an era of data has been reached in various industries such as a communication industry and a manufacturing industry. Data transaction will be a development trend of the future. On the one hand, the data transaction may reduce an investment and operation and maintenance costs of the sensor owner, and on the other hand, the data transaction may also promote a value mining of the data.

In a traditional data transaction method, the data transaction is usually completed through a third-party transaction center. Such data transaction method is difficult to maintain integrity of transaction data, and due to the non-transparency of the transaction and a difficulty in tracing a transaction history, the relevant information of a transaction process is easy to be modified. In addition, such data transaction method is also difficult to ensure that a new data flow may be established for the data receiver in time when a data flow is interrupted due to network reasons or data provider reasons, which may damage interests of both parties to the transaction.

SUMMARY

To at least partially solve or alleviate the above problem, a method for real-time data communication, an electronic device and a system according to embodiments of the present disclosure are provided. Taking into account a possibility of data interruption, when a data flow is interrupted, a data receiver may automatically switch to another data flow, thereby ensuring that a contract is established with a data provider that meets a data volume requirement at any time.

According to a first aspect of the present disclosure, a method for real-time data communication executed at an electronic device of a data buyer is provided. The method may include: publishing a resource pool contract to a blockchain network, wherein the resource pool contract is configured to trigger an establishment of a resource pool including a first number of resources; establishing a data flow with each data transmitter corresponding to a second number of resources in the resource pool, wherein the second number is less than the first number; and receiving real-time data transmitted by the data transmitter through the data flow.

In some embodiments, the resource pool contract includes a method for selecting resource. The method for selecting resource is configured to be invoked in response to one or more nodes in the blockchain network determining that a resource switching condition is satisfied, so that the data receiver establishes the data flow with each data transmitter corresponding to the second number of resources. In some embodiments, the method for selecting resource is further invoked by the one or more nodes in the blockchain network to select, from the resource pool, a resource other than a resource for which a corresponding data flow established with the data receiver exists currently, so that the data receiver establish a new data flow with a data provider corresponding to the selected resource. In some embodiments, the resource switching condition includes one or more of: a period for switching resource; and a data flow being interrupted. In some embodiments, the resource pool contract includes a method for adding resource to the resource pool. The method for adding resource to the resource pool includes a rule for adding resource to the resource pool, wherein the method for adding resource to the resource pool is configured to trigger one or more nodes in the blockchain network to add a resource to the resource pool in response to determining that the resource satisfies the rule for adding resource to the resource pool. In some embodiments, the resource in the resource pool is at least one of the data transmitter or a data flow contract. In some embodiments, in a case where the resource is the data transmitter, the resource pool contract further includes at least one of: a list for data transmitter identifier; a period for switching data transmitter; a price and/or pricing method for data flow; a method for adding data transmitter to the resource pool; a method for selecting data transmitter; and a method for establishing data flow. In some embodiments, in a case where the resource is the data flow contract, the resource pool contract further includes at least one of: a list for data flow contract identifier; a period for switching data flow contract; a method for adding data flow contract to the resource pool; and a method for selecting data flow contract. In some embodiments, the establishing a data flow with each data transmitter corresponding to a second number of resources in the resource pool includes: executing the method for establishing data flow in the resource pool contract to establish a data flow with at least one data transmitter corresponding to no more than the second number of resources, or executing the method for selecting data flow contract in the resource pool contract to trigger no more than the second number of data flow contracts, so as to establish a data flow with at least one data transmitter corresponding to the second number of data flow contracts in the resource pool.

According to a second aspect of the present disclosure, a first electronic device used at the data buyer is provided. The electronic device includes: a processor; and a memory storing instructions, wherein the instructions, when executed by the processor, cause the first electronic device to implement the method according to the first aspect of the present disclosure.

According to a third aspect of the present disclosure, a method for real-time data communication executed at an electronic device of a data provider is provided. The method includes: receiving a resource pool contract from a blockchain network, wherein the resource pool contract is configured to trigger an establishment of a resource pool including a first number of resources, the resource pool contract further includes a parameter indicating a second number of resources expected to be activated simultaneously in the resource pool, and the second number is less than the first number; and transmitting a message, which indicates consent to be added to the resource pool, to the blockchain network.

In some embodiments, the method further includes: establishing, under a coordination of the blockchain network executing the resource pool contract, a data flow with a data receiver publishing the resource pool contract; and transmitting real-time data to the corresponding data receiver through the established data flow.

According to a fourth aspect of the present disclosure, a method for real-time data communication executed at an electronic device of a data provider is provided. The method includes: publishing a data flow contract to a blockchain network, wherein the data flow contract is configured to trigger to add a data flow provided by a data provider to a resource pool as a resource, the resource pool is a resource pool including a first number of resources, an establishment of the resource pool is triggered by a resource pool contract published by a data receiver, the resource pool contract further includes a parameter indicating a second number of resources expected to be activated simultaneously in the resource pool, and the second number is less than the first number; and receiving a message, which indicates that the data flow contract is added to the resource pool, from the blockchain network.

In some embodiments, the method further includes: establishing, under a coordination of the blockchain network executing the resource pool contract, a data flow with a data receiver publishing the resource pool contract; and transmitting real-time data to the corresponding data receiver through the established data flow. In some embodiments, the data flow contract includes at least one of: an identifier for the data flow contract; an identifier for the data transmitter; a price and/or pricing method for the data flow; a content information; a method for establishing the data flow; and a method for adding to the resource pool.

According to a fifth aspect of the present disclosure, a second electronic device used at the data provider is provided. The electronic device includes: a processor; and a memory storing instructions, wherein the instructions, when executed by the processor, cause the second electronic device to implement the method according to the third or fourth aspect of the present disclosure.

According to a sixth aspect of the present disclosure, a system for real-time data communication is provided. The system includes: a blockchain network; a first electronic device communicatively coupled to the blockchain network and including: a first processor; a first memory storing instructions, wherein the instructions, when executed by the first processor, cause the first electronic device to: publish a resource pool contract to the blockchain network, wherein the resource pool contract is configured to trigger an establishment of a resource pool including a first number of resources; establish a data flow with each data transmitter corresponding to a second number of resources in the resource pool, wherein the second number is less than the first number; and receive real-time data transmitted by the data transmitter through the data flow; one or more second electronic devices, wherein each second electronic device is communicatively coupled to the blockchain network and includes: a second processor; a second memory storing instructions, wherein the instructions, when executed by a corresponding second processor, cause a corresponding second electronic device to: receive the resource pool contract from the blockchain network; and transmit a message, which indicates consent to be added to the resource pool, to the blockchain network, or cause the corresponding second electronic device to: publish a data flow contract to the blockchain network, wherein the data flow contract is configured to trigger to add a data flow provided by the data provider to the resource pool as a resource; and receive a message, which indicates that the data flow contract is added to the resource pool, from the blockchain network.

According to a seventh aspect of the present disclosure, a computer-readable storage medium having instructions stored thereon is provided. The instructions, when executed by a processor, cause the processor to execute the method for real-time data communication of the first, third or fourth aspect mentioned above.

In a case of using the above method, electronic device, system and/or computer-readable storage medium, on the one hand, data loss due to equipment failure of the data provider is avoided, and on the other hand, extra costs due to an establishment of a contract with more data providers is avoided.

BRIEF DESCRIPTION OF THE DRAWINGS

The above and other objects, features and advantages of the present disclosure will be made more apparent by the following description of preferred embodiments of the present disclosure in conjunction with the accompanying drawings, in which:

FIG. 7 is a flowchart illustrating an example method executed in an electronic device of a data transmitter according to an embodiment of the present disclosure.

FIG. 8 is a flowchart illustrating another example method executed in an electronic device of a data transmitter according to an embodiment of the present disclosure.

DETAILED DESCRIPTION OF EMBODIMENTS

Figure 1:
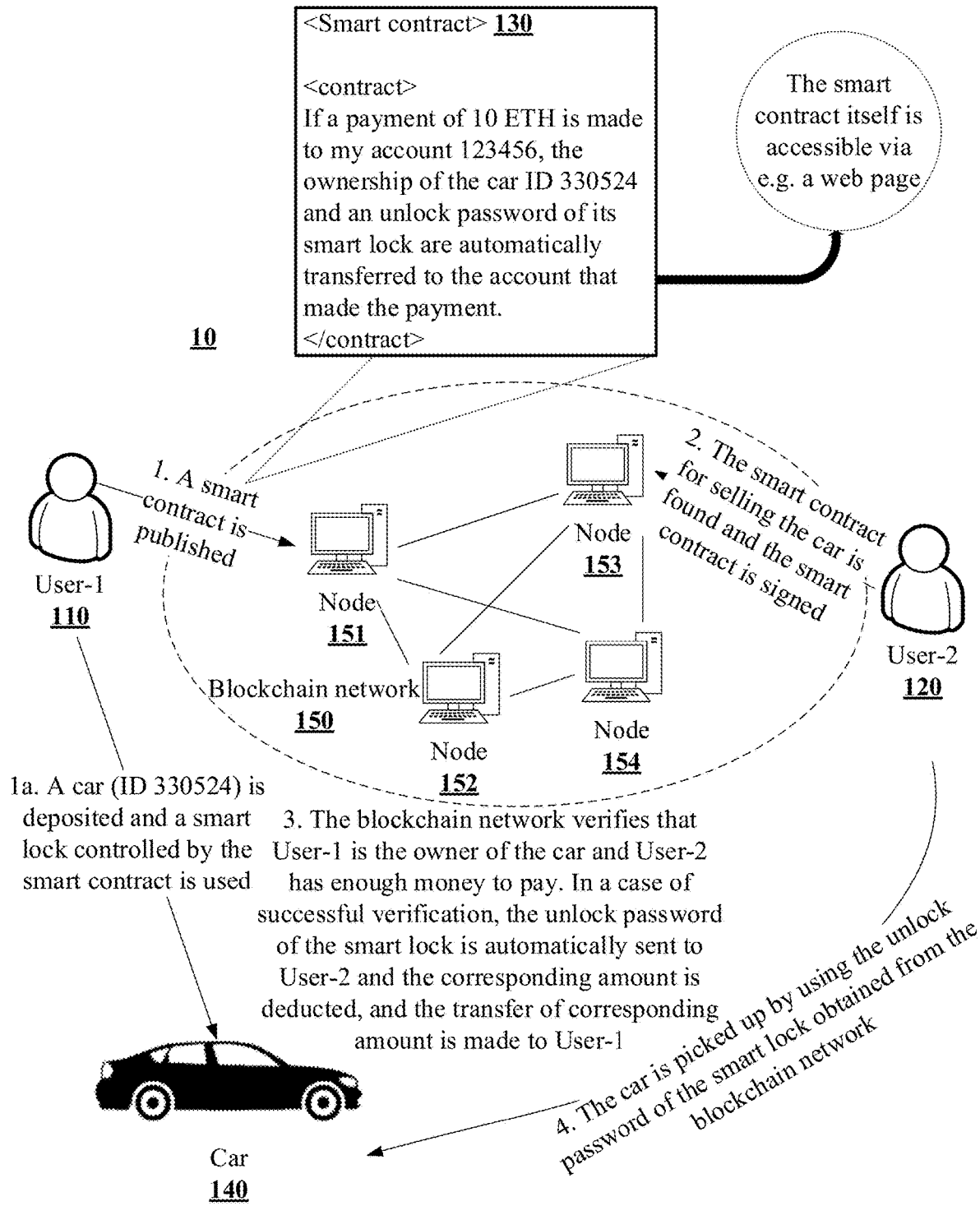
FIG. 1 is a schematic diagram illustrating an example application scenario for illustrating a blockchain-network-based example smart contract.

In order to make objects, technical solutions and advantages of the present application more clear, the present application will be further described in detail below with reference to the accompanying drawings. It should be noted that the following description is for illustration only, and not for limiting the present disclosure. In the following description, numerous specific details are set forth in order to provide a thorough understanding of the present disclosure. However, it is obvious to those skilled in the art that it is not necessary to adopt these specific details to practice the present disclosure. In other instances, well-known circuits, materials or methods are not described in detail in order to avoid obscuring the present disclosure.

Throughout this specification, references to "one embodiment," "an embodiment," "one example," or "an example" mean that a particular feature, structure, or characteristic described in conjunction with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular feature, structure or characteristic may be combined in any suitable combination and/or sub-combination in one or more embodiments or examples. Furthermore, those skilled in the art should understand that the drawings provided herein are for illustrative purposes and are not necessarily drawn to scale. The term "and/or" as used herein includes any and all combinations of one or more of the associated listed items.

It should be noted that although the embodiments herein are described in detail by taking "real-time data transaction" as an example below, the present disclosure is not limited thereto. In fact, the real-time data transaction is only one specific application scenario of a scheme of "real-time data communication" proposed here. The scheme of the real-time data communication in this application may be applied to any situation that requires the real-time data communication, such as non-transactional real-time data communication.

Furthermore, although the term "smart contract" or "contract" in an ethereum technology and a Solidity programming language it uses are adopted here, the present disclosure is not limited thereto. In fact, the term "contract" here may refer to information that related to establishing, maintaining, changing, tearing down a data flow, etc. which proposed by at least one party in a data transaction (or data communication). Thus the terms "smart contract" and/or "contract" etc. may also be any information that may be transmitted on the network, such as an application, an APP, a source code, an executable code, a message, a text, binary data, software, firmware, etc. In addition, the terms "smart contract" and/or "contract" may not refer to other information related to the data flow as well when applied in areas other than the real-time data communication.

Furthermore, the term "data flow" generally refers to a series of digitally encoded ordered signals or their carriers which are used to transmit or receive information during their transmission. In other words, the term "data flow" here may refer to a series of information itself transmitted between two or more entities, and may also refer to a logical channel established between the two or more entities to transmit such information.

As mentioned above, a traditional data transaction method has various problems, such as: difficulty in maintaining integrity of transaction data, non-transparency of the transaction, difficulty in tracing a transaction history, easy modification of relevant information, and inability to establish a new data flow for the data receiver in time when the data flow is interrupted etc., so that interests of both parties in the data transaction may be damaged. Compared with the traditional data transaction method, a blockchain-based data transaction method has received more and more attention owing to advantages of distribution, decentralization, and immutability and irrevocability of the transaction data.

A blockchain-based data transaction system usually includes one or more data providers (here, may further be referred to as "a data transmitter"), one or more data buyers (here, may further be referred to as "a data receiver") and the blockchain network. The blockchain network usually includes a plurality of nodes. Information related to the data transaction between the data provider and the data buyer may be stored in the plurality of nodes in the blockchain network. During a data transaction process, one or both of the data buyer and the data provider may publish a smart contract to the blockchain network. The smart contract may trigger the data buyer to establish a data flow with the data provider, and receive data and pay through the data flow.

The smart contract is one of the important features of a blockchain-based data transaction. A concept of the smart contract was first proposed by Nick Szabo in 1994, who defined the smart contract as follows: "A smart contract is a set of commitments defined in a digital form, including an agreement on which contract participants may execute these commitments". The smart contract is a computer protocol designed to inform, verify, or execute a contract in an informative manner. The smart contract allows for trusted transactions without a third-party, and such transactions are traceable and often irreversible (unless there is a retraction clause in the contract, etc.).

More generally, the smart contract may be thought of as a computer program or a transaction agreement intended to automatically execute, control or document a legally relevant event in accordance with terms of the contract or the agreement. A purpose of the smart contract is to reduce the need for a trusted arbitrator, reduce the cost of arbitration and enforcement, reduce fraud losses, and reduce a malicious and an accidental behavior.

A blockchain-technology-based smart contract may not only give play to advantages of the smart contract in terms of cost efficiency, but may further avoid the malicious behavior that interferes with a normal execution of the contract. The smart contract is written into the blockchain in the digital form. Characteristics of the blockchain technology ensure that the entire process of storage, reading, and execution is transparent, traceable and immutable. Besides, a state machine system may be established through a consensus algorithm that comes with the blockchain, so that the smart contract may run more efficiently. Next, a blockchain-network-based smart contract will be explained in detail with reference to FIG. 1.

FIG. 1 is a schematic diagram illustrating an example application scenario 10 for illustrating a blockchain-network-based example smart contract. As shown in FIG. 1, the scenario 10 includes a user-1 110 who wants to sell his own car 140, a user-2 120 who wants to buy a car, and a blockchain network 150 including a plurality of nodes 151 to 154. However, it should be noted that the scenario 10 of FIG. 1 is for illustration only, and the present disclosure is not limited thereto. In other embodiments, the scenario 10 may include more users and items (e.g., the car 140), and the blockchain network 150 may include more, fewer, or different nodes.

As shown in FIG. 1, the user-1 110 wants to sell his car 140. Thus, at step 1, the user-1 110 may write a smart contract 130 and publish the smart contract 130 to the blockchain network 150.

For example, in some embodiments, the user-1 110 may register to an Ethereum network, for example, obtain an assigned account ID (e.g., 123456), and then upload and deploy the written smart contract 130 to at least one of the nodes 151 to 154 on the network through an application provided by the Ethereum network.

In some embodiments, a content of a simple example smart contract 130 may look like this:

```
// SPDX-License-Identifier: GPL-3.0
pragma solidity >0.6.99 <0.8.0;
contract Sell_A_Car{
    address payable public seller; ///member variable "seller"
    address payable public buyer; /// member variable "buyer"
    address public car; /// member variable "car"
    bytes32 passcode; /// member variable "smart lock password"
    enum State { Created, Locked, Release, Inactive }
    State public state; /// member variable "contract state"
    modifier condition(bool _condition) {
        require(_condition);
        _;
    }
    modifier onlyBuyer( ) {
        require(
            msg.sender == buyer,
            "Only the buyer may invoke this function."
        );
        _;
    }
    modifier only Seller( ) {
        require(
            msg.sender == seller,
            "Only the seller may invoke this function."
        );
        _;
    }
    modifier inState(State _state) {
        require(
            state == _state,
            "invalid state"
        );
        _;
    }
    event Aborted( ); /// Publish an event that the seller aborted the transaction
    event PurchaseConfirmed( ); /// Publish an event that the buyer confirms a purchase
    event CarReceived( );        /// Publish an event that the buyer
                                 has received the car
    event SellerRefunded( );     /// Publish an event that the seller
has received a payment for the car
    /// A constructor, which initializes the contract and specified an
identity of the seller, an identity of the car and the smart lock password
involved in the contract.
        constructor(address payable _car, bytes32 _passcode) payable {
            seller = msg.sender;
            car = _car;
            passcode = _passcode;
        }
        /// A function of abort purchase, which may only be invoked by the
seller before the contract is locked.
        function abort( )
            public
            onlySeller
            inState(State.Created)
```

```
        {
            emit Aborted( );
            state = State.Inactive;
        }
        /// A function that the buyer confirms the purchase, and the
contract notifies the buyer of the smart lock password.
        /// The transaction must include 10 ETH, which will be locked
until a confirmReceived function is invoked.
        function confirmPurchase( ) returns (bytes32)
            public
            inState(State.Created)
            condition(msg.value == 1e19)
            payable
        {
            emit PurchaseConfirmed( );
            buyer = msg.sender;
            state = State.Locked;
            return passcode;
        }
        /// A function to confirm that the buyer has received the car, which
will release the locked ETH
        function confirmReceived( )
            public
            onlyBuyer
            inState(State.Locked)
        {
            emit CarReceived( );
            state = State.Release;
        }
        /// This function returns money to the seller, that is, a function that
pays the seller for the car
        function refundSeller( )
            public
            only Seller
            inState(State.Release)
        {
            emit SellerRefunded( );
            state = State.Inactive;
            seller.transfer(address(this).balance)
        }
}
```

A general function of the above code may be described in "Smart Contract 130" in FIG. 1. When a buyer (e.g., the user-2 120) pays 10 ETH to the user-1 110, the smart contract will automatically inform the smart lock password to the buyer and waits for the buyer to confirm receipt. After successful receipt, the blockchain network 150 will record a transfer of an ownership of the car through a published event and transfer the 10 ETH to the user-1 110.

Specifically, when initializing (or instantiating) the smart contract 130, a seller (e.g., the user-1 110) may set a blockchain network address of the seller (e.g., 123456 shown in FIG. 1), a blockchain network address of the car (e.g., 330524 shown in FIG. 1), and the smart lock passcode associated with the car (e.g., the member variable "passcode" in the above code) through, for example, a constructor "constructor" of the contract.

Additionally, before, after, or at the same time as the step 1, the user-1 110 may, at step 1*a*, deposit the car 140 in a public garage and lock the car 140 using a smart lock controlled by the smart contract 130 (e.g., the car 140 is placed in a designated garage locked by the smart lock), and its unlock password is set to, for example, the preceding passcode. In other embodiments, the smart lock may have a networking function, and may automatically generate a new password before each transaction under the control of the smart contract 130 to prevent the password from being known to anyone other than a final buyer due to the failure of a previous transaction.

Afterwards, the smart contract 130 itself may be made known to the public, e.g., through a web page publication.

Later, at step 2, the user-2 120 who wants to buy the car may find the smart contract 130 published by the user-1 110 through the web page or directly on the blockchain network 150, learn relevant information through the smart contract 130 (e.g., through a web page associated with the smart contract 130, or in other embodiments, conditions of the car are written directly in the smart contract 130), and sign the smart contract 130 if the user-2 120 wants to buy the car. Specifically, the user-2 120 may sign the contract 130 by, for example, invoking the above "confirmPurchase( )" member method.

After receiving a signature (or invoking a method) of the user-2 120, at step 3, the plurality of nodes in the blockchain network 150 may verify the transaction, such as verifying whether the user-1 110 is an owner of the car (e.g., by checking a transaction record related to the car ID 330524), and whether an account of the user-2 120 has enough money to make the payment (e.g., verified by the modifier condition (msg.value==1e19) of the confirmPurchase( ) method in the above code). In a case of successful verification, an unlock password of the smart lock is automatically sent to the user-2 120 and a corresponding amount is reduced in the account of the user-2 120, and the corresponding amount is added to an account of the user-1 110.

At step 4, after obtaining the unlock password of the smart lock from the blockchain network 150, the user-2 120 may pick up the car 140 with the obtained unlock password. In other embodiments, the user-2 120 may further confirm that the transaction is successful (as shown in the above example code) after determining that the car 140 may be picked up, and then confirm a corresponding transfer operation.

In some embodiments, the blockchain network 150 may record transaction information in at least one of the plurality of nodes 151 to 154. For example, when a plurality of events in the above code are published, the corresponding events may be recorded in respective nodes to record a transaction process.

It should be noted that although the simple example smart contract for transaction is given above, the present disclosure is not limited thereto. In fact, the smart contract 130 may be modified to include more or different member variables and/or member methods, etc. It may further be used in a data transaction scenario as described below.

For example, a data provider may be the user-1 110 and a data buyer may be the user-2 120. Details of a data transaction between two parties may be specified in the smart contract by, for example, a parameter (e.g., a parameter in the member method or the member variable) such as (but not limited to): how to establish the data flow and a price/pricing method for data flow, how to settle the data flow, how to end the data flow, a resolution scheme of a disagreement, a termination condition, etc. In a case of adopting the blockchain network 150 to achieve such data transaction, problems such as the difficulty in maintaining the integrity of transaction data, non-transparency of the transaction, the difficulty in tracing the transaction history and the easy modification of related information may be well solved.

However, in some cases, when the data buyer needs to transact with a plurality of data providers at the same time to obtain sufficient data, for example, when a production equipment provider (as the data buyer) wants to obtain real-time production data of his production equipment from a plurality of factories (as the data provider) that use his production equipment to improve a corresponding production equipment, the production equipment provider may establish data flows with the plurality of factories at the same time, obtain data from each factory and pay for each data flow. In this case, there may be a problem that one or more data providers do not provide the data for a period of time. For example, the production equipment of the data provider may not upload equipment operation data due to a production plan adjustment and a production line being stopped. For another example, industrial production equipment may fail to work properly and fail to upload the equipment operation data due to a malfunction. The above situations will lead to data interruption and affect a normal business of the data buyer.

One solution to this problem is that in order to ensure sufficient data acquisition, the data buyer may establish contracts with more data providers, thereby avoiding data loss due to the equipment failure. For example, the data buyer may need data from two data providers under a normal circumstance, but in order to ensure the sufficient data acquisition in a case that one or even two data providers are disconnected, the data buyer will usually establish data flows with three or more data providers and pay for these data flows.

However, a new problem may be generated: on the one hand, the data buyer needs to pay extra fees; on the other hand, the data buyer may not be able to fully process the purchased real-time data due to limited processing capacity, resulting in a waste of costs and data resources.

To this end, a solution for real-time data communication according to the embodiments of the present disclosure is provided. Hereinafter, the technical solution will be described in detail with reference to FIG. 2 to FIG. 5.

Figure 2:
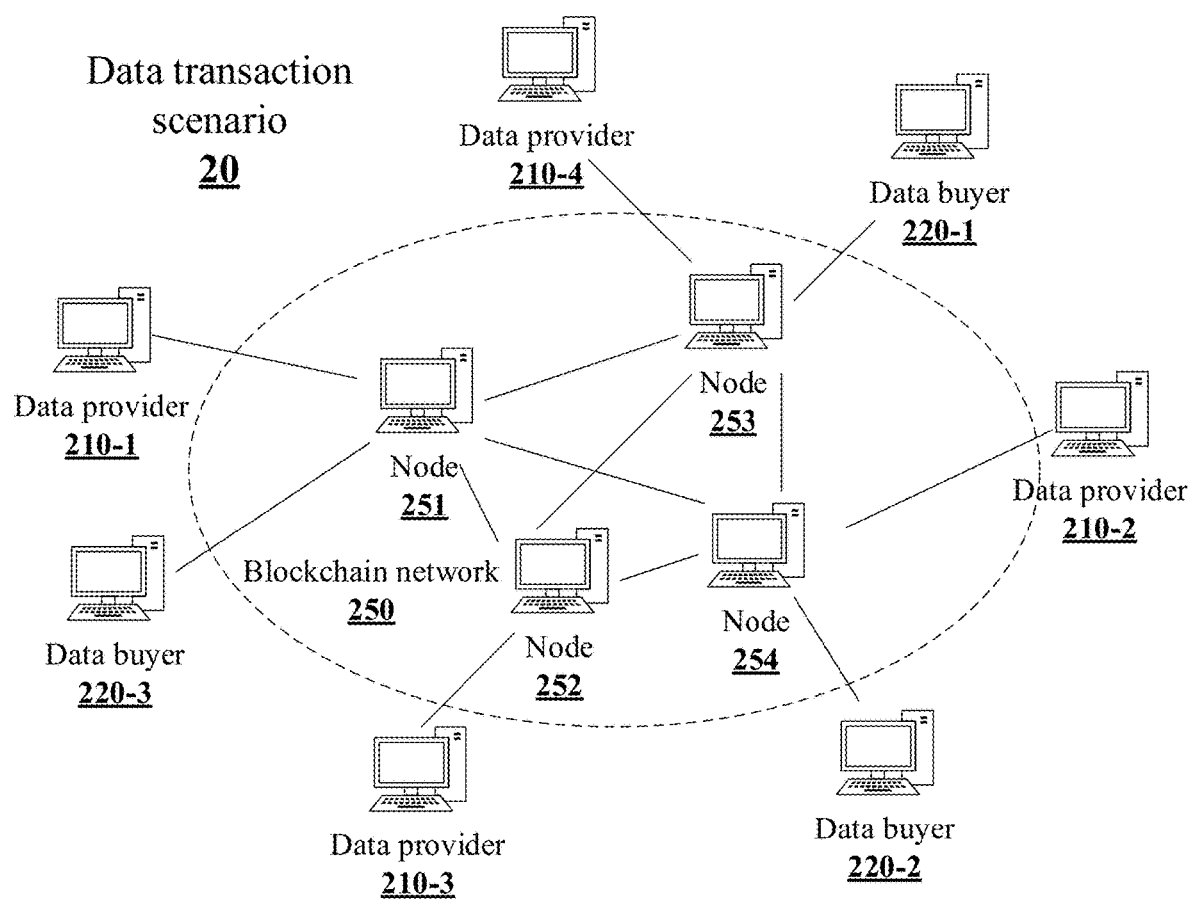
FIG. 2 is a schematic diagram illustrating a blockchain-based data transaction scenario according to an embodiment of the present disclosure.

FIG. 2 is a schematic diagram illustrating a blockchain-based data transaction scenario 20 according to an embodiment of the present disclosure. In this example scenario 20, there may be four data providers 210-1 to 210-4 (hereinafter collectively referred to as a data provider or a data transmitter 210) and three data buyers 220-1 to 220-3 (hereinafter collectively referred to as a data buyer or a data receiver 220). The data provider 210 and the data buyer 220 may conduct data transaction through a blockchain network 250. The blockchain network 250 may include four nodes 251 to 254 that communicate with each other. However, the present disclosure is not limited thereto. In other embodiments, there may be more, fewer or different data providers, data buyers and/or nodes of the blockchain network 250.

Specifically, each data provider 210-1 to 210-4 may respectively publish a smart contract to the blockchain network 250. The smart contract may contain information related to the data transaction, such as a type and a price of the data flow, a method for establishing the data flow and other content provided by the data provider. Each data buyer 220-1 to 220-3 may sign a corresponding smart contract according to its own needs, and conduct the transaction with one or more corresponding data providers. In some embodiments, such data transaction is achieved through a data flow established between the data buyer and the data provider.

Similarly, the data buyers 220-1 to 220-3 may also publish a smart contract to the blockchain network 250 to buy a corresponding real-time data flow. In this case, the data provider 210 may select the aforementioned corresponding smart contract according to its own ability and willingness, and achieve the data transaction by establishing the data flow. In other embodiments, the data providers 210-1 to 210-4 and the data buyers 220-1 to 220-3 may respectively publish their own smart contracts to provide or buy the real-time data.

As mentioned above, in order to avoid the data loss due to the equipment failure, the data buyer 220 establishes the contract with more data providers 210 than its actually required. On the one hand, the data buyer 220 needs to pay extra fees. On the other hand, the data buyer 220 may not be able to completely process the purchased data due to limited processing capacity, resulting in a waste of costs.

To at least partially solve or alleviate the above problem, a method for real-time data communication, an electronic device and a system according to the embodiments of the present disclosure are provided. In general, when a resource is disconnected, this scheme may be implemented to automatically switch to other resources by establishing a resource pool with more resources than required rated resources, so as to ensure to establish the contract with the data provider that satisfies resource needs at any time. Hereinafter, two embodiments of establishing the resource pool will be described respectively with reference to FIG. 3 and FIG. 4.

Figure 3:
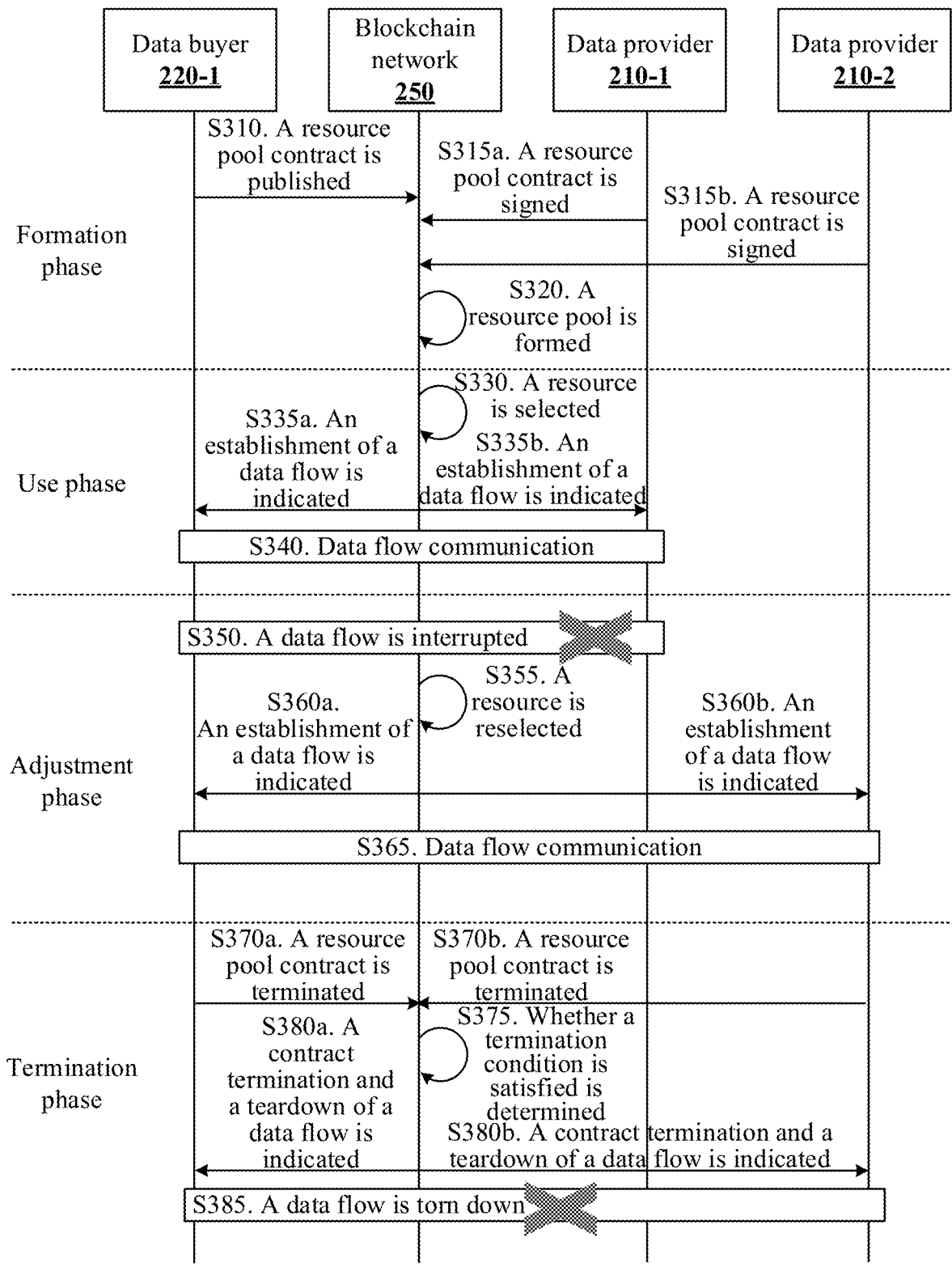
FIG. 3 is a schematic diagram illustrating a message flow of an example real-time data transaction process according to an embodiment of the present disclosure.

FIG. 3 is a schematic diagram illustrating a message flow of an example real-time data transaction process according to an embodiment of the present disclosure. As shown in FIG. 3, the method exemplarily includes four phases, namely, a formation phase, a use phase, an adjustment phase, and a termination phase. However, it should be noted that these phases do not necessarily appear in the order shown, but may be reversed. For example, the termination phase may occur before the adjustment phase or even before the use phase, thereby ensuring that the data buyer and/or the data provider has a right to terminate the transaction at any time subject to compliance of the smart contract. Furthermore, as will be described below, steps in the various phases may further, for example, be performed interleaved, and thus the embodiments of the present disclosure are not limited to the order in which the steps are performed as shown in FIG. 3.

In addition, although the embodiment shown in FIG. 3 only involves the data buyer 220-1, the data provider 210-1, the data provider 210-2 and the blockchain network 250 in FIG. 2, the present disclosure is not limited thereto. This embodiment is only used to assist readers in understanding the technical content of the present disclosure. In other embodiments, it is possible to involve more data buyers and/or data providers.

Hereinafter, each phase shown in FIG. 3 will be described in detail with reference to FIG. 2.

The Formation Phase

At step S310, the data buyer 220-1 may publish a resource pool contract (or, more specifically, a data provider contract) to the blockchain network 250. The resource pool contract may be used to trigger an establishment of the resource pool including a first number (it is two in this example, but not limited to this) of resources (or more specifically, the data provider). In some embodiments, the resource pool contract may include at least one of: a list for data provider identifier; a period for switching data provider; a price and/or pricing method for data flow; a method for adding data provider to the resource pool; a method for selecting data provider; and the method for establishing data flow.

For example, the member variables and the member methods that may be included in the smart contract are shown in Table 1 below.

TABLE 1

Member table for the example resource pool contract

| Smart Contract Member | Description |
|---|---|
| Member Variable | Maximum number of data providers<br>Rated number of data providers<br>List for data provider identifier<br>Period for switching data provider (optional)<br>Number of data flow providers<br>List for data flow provider<br>Price and pricing method for data flow |
| Member Method | Method for adding data provider to the resource pool( )<br>///include a rule for adding to the resource pool<br>Method for selecting data provider( ) ///update the list for data provider<br>Method for establishing data flow( ) ///used to establish the data flow between the data provider and the data buyer |

In this embodiment, the data provider may be used as the resource, that is, the member variable "Maximum number of data providers" is referred to as the first number, which is used to define a number of resources that may be accommodated in the resource pool corresponding to the smart contract. Furthermore, the member variable "Rated number of data providers" is referred to as the second number, which is used to define an expected number of concurrently working (or active) resources in the resource pool and is typically less than the first number. When the resource pool is working normally, there is usually at least one resource as a backup resource, which may immediately establish a data flow with the data buyer (e.g., the data buyer 220-1) and provide the real-time data when the data flow interruption occurs, thereby solving or at least alleviating the data interruption problem that the data buyer 220-1 may encounter. In addition, since no data flow is actually established for the data transaction, the data provider may be invited to be added to the resource pool at the lowest cost. In other words, in a case where the resource in the resource pool corresponds to the data provider (the data transmitter), the data buyer (or the data receiver) may establish the data flow with the second number of resources (i.e., the data provider or the data transmitter) in the resource pool, and the second number may be less than the maximum number of data providers (i.e., the first number) in the resource pool. Therefore, since the resource itself may also correspond to the data provider, it may further be considered that the data buyer (or the data receiver) establishes the data flow with the data provider (or the data transmitter) corresponding to the second number of resources in the resource pool.

Returning to FIG. 3, at steps S315*a* and S315*b*, the data providers 210-1 and 210-2 may respectively sign the resource pool contract published by the data buyer 220-1. For example, a corresponding data provider may be added to the resource pool by invoking the "Method for adding data provider to the resource pool( )". It should be noted that these two steps may be performed simultaneously or at least partially sequentially.

At step S320, the blockchain network 250 may form the resource pool according to the added data providers 210-1 and 210-2. In the embodiment shown in FIG. 3, since the "Maximum number of data providers" is defined as two in the published resource pool contract, the resource pool may include two resources, i.e. the data providers 210-1 and 210-2. In some embodiments, next, the use phase of the resource pool may be entered.

In addition, as shown in Table 1, the method for adding data provider to the resource pool may include a rule for adding to the resource pool, which may specify a rule that the data provider adding to the resource pool should satisfy. For example, the rule may be related to the content, quality and price of the data provided by the data provider, or a reputation score of the data provider. For example, the rule for adding to the resource pool may be: the content of the data provided by the data provider needs to satisfy relevant requirements; the quality of the data or the reputation score of the data provider is higher than a certain threshold; or the price of the data is lower than a certain threshold, etc. When the resource pool is forming, the data provider may actively request to add to the resource pool, or the blockchain network 250 may send an invitation to add to the resource pool to the data provider that satisfies the rule for adding to the resource pool. In a case that the data provider agrees to add to the resource pool, the data provider is added to the resource pool by adding an identifier for the data provider to a list for data provider in the resource pool contract. Furthermore, if the data provider that satisfies the rule for adding to the resource pool does not agree to add to the resource pool, the blockchain network 250 may find another data provider that satisfies the rule for adding to the resource pool and send it the invitation to add to the resource pool. This process may be repeated until the resource pool includes the first number of resources specified in the resource pool contract.

The Use Phase

At step S330, the one or more nodes in the blockchain network 250 or the data buyer 220-1 may invoke the method for selecting data provider in the resource pool contract to select the second number of data providers. In some embodiments, the second number may be less than the first number. In the embodiment shown in FIG. 3, the blockchain 250 may select the data provider 210-1. In some embodiments, the method for selecting data provider may be, for example, a selection method based on the data quality, a selection method based on the data price, a selection method based on the reputation score of the data provider, and the like. In other embodiments, the method for selecting data provider may further be a random selection method.

Next, in steps S335*a* and/or S335*b*, the blockchain 250 may respectively instruct the data buyer 220-1 and the data provider 210-1 to establish the data flow with each other. For example, the data flow between the two may be established by invoking the "Method for establishing data flow( )" in the resource pool contract. For example, in this method, the data buyer 220-1 or the data provider 210-1 may be provided with the other party's information and make it establish the data flow with the other party. In other embodiments, if the data flow needs to be regulated, the blockchain network 250 may respectively establish the data flow with the data buyer 220-1 and the data provider 210-1, and forward between the two data flows. Therefore, the data flow may be regulated, and for example, fair, open, and just charging processing (e.g., an amount of data transmitted by the data flow, whether the data flow is interrupted, etc.) is performed accordingly.

At step S340, the data buyer 220-1 may receive the real-time data from the data provider 210-1 through the established data flow and perform corresponding processing.

In the above embodiment, the steps S335*a* and/or S335*b* of establishing the data flow are performed after the step S320 of forming the resource pool by the blockchain network 250. However, the present disclosure is not limited thereto. In fact, in other embodiments, the steps S335*a* and/or S335*b* of establishing the data flow may be performed before or concurrently with the forming of the resource pool. For example, before or at the same time when the data buyer 220-1 publishes the resource pool contract, the data buyer 220-1 establishes the data flow with the data provider 210-1 for transmitting the real-time data. Then the data buyer 220-1 re-signs the resource pool contract through, for example, the formation phase, and incorporates the data provider 210-1, which has established the data flow, into the resource pool as the resource in the resource pool.

The Adjustment Phase

In the adjustment phase, when the one or more nodes in the blockchain network 250 determine that a resource switching condition is satisfied, the method for selecting data provider in the resource pool contract may be invoked again to reselect the second number of data providers. In some embodiments, the resource switching condition may be a period for switching resource. In another embodiment, the resource switching condition may be the data flow being interrupted. The data flow being interrupted may be caused by the equipment failure of the data provider.

For example, in the embodiment of FIG. 3, at step S350, the one or more nodes in the blockchain network 250 detect the data flow being interrupted; for example, it is detected in the manner shown in FIG. 5 below. In step S355, the one or more nodes in the blockchain network 250 may reselect the data provider (e.g., the data provider 210-2) by, for example, invoking the "Method for selecting data provider( )".

Next, similar to the steps S335*a* and S335*b*, at steps S360*a* and/or S360*b*, the one or more nodes in the blockchain 250 may respectively instruct the data buyer 220-1 and the data provider 210-2 to establish a part of the data flow and finally form the data flow forwarded through the blockchain network, or instruct one of the parties to directly establish the data flow between the two.

At step S365, the data buyer 220-1 may receive the real-time data from the reselected data provider 210-2 through a new established data flow.

The Termination Phase

At steps S370*a* and S370*b*, the data buyer 220-1 and/or the data provider 210-2 may send a request to the blockchain network 250 for resource pool contract termination. For example, in some embodiments, when the data provider 210-2 needs to shut down for maintenance, it may consider temporarily withdrawing from the resource pool, and thus may initiate the resource pool contract termination at the step S370*b*. In other embodiments, when the data buyer 220-1 may need to temporarily maintain the equipment, it may further initiate the resource pool contract termination. These resource pool contract termination requests should not violate relevant regulations that may exist in the previously published resource pool contract, such as a period of the resource pool contract, etc. In addition, in other embodiments, after the data buyer 220-1 obtains required data, it may further initiate the resource pool contract termination.

At step S375, the one or more nodes in the blockchain network 250 may determine whether the data buyer 220-1 and/or the data provider 210-2 satisfy a contract termination condition. For example, for the data buyer 220-1, the contract termination condition may be whether the data buyer has paid for the data. For the data provider 210-2, the contract termination condition may be whether the data provider has provided enough data, and the like. In addition, it is further possible to check whether the two parties satisfy other contract termination conditions, such as the period of the resource pool contract, etc., as described above.

In a case that the one or more nodes in the blockchain network 250 determine that the data buyer 220-1 and/or the data provider 210-2 satisfy the contract termination condition, the one or more nodes in the blockchain network 250 may instruct the data buyer 220-1 and/or the data provider 210-2 to terminate the contract and tear down the data flow between the two at steps S380*a* and/or S380*b*. For example, in the case where the data flow is established directly between the aforementioned two, one of the two may be instructed to tear down the data flow. In the case where the data flow is established via the blockchain network 250, the two may be respectively instructed to tear down the data flow.

At step S385, the data flow between the data buyer 220-1 and the data provider 210-2 is torn down, and the contract is terminated.

In this way, by adopting a data communication method shown in FIG. 3, the data buyer 220-1 may be provided with a backup resource (e.g., a backup data flow of the data provider 210-2) by establishing the resource pool, so as to prevent that a new data flow may not be established in time when a certain data flow (e.g., the data flow of the data provider 210-1) is interrupted. In addition, relevant information of such established data flow is retained in the blockchain network, which makes it have good traceability and facilitates the management and maintenance of data transaction business by both parties.

Figure 4:
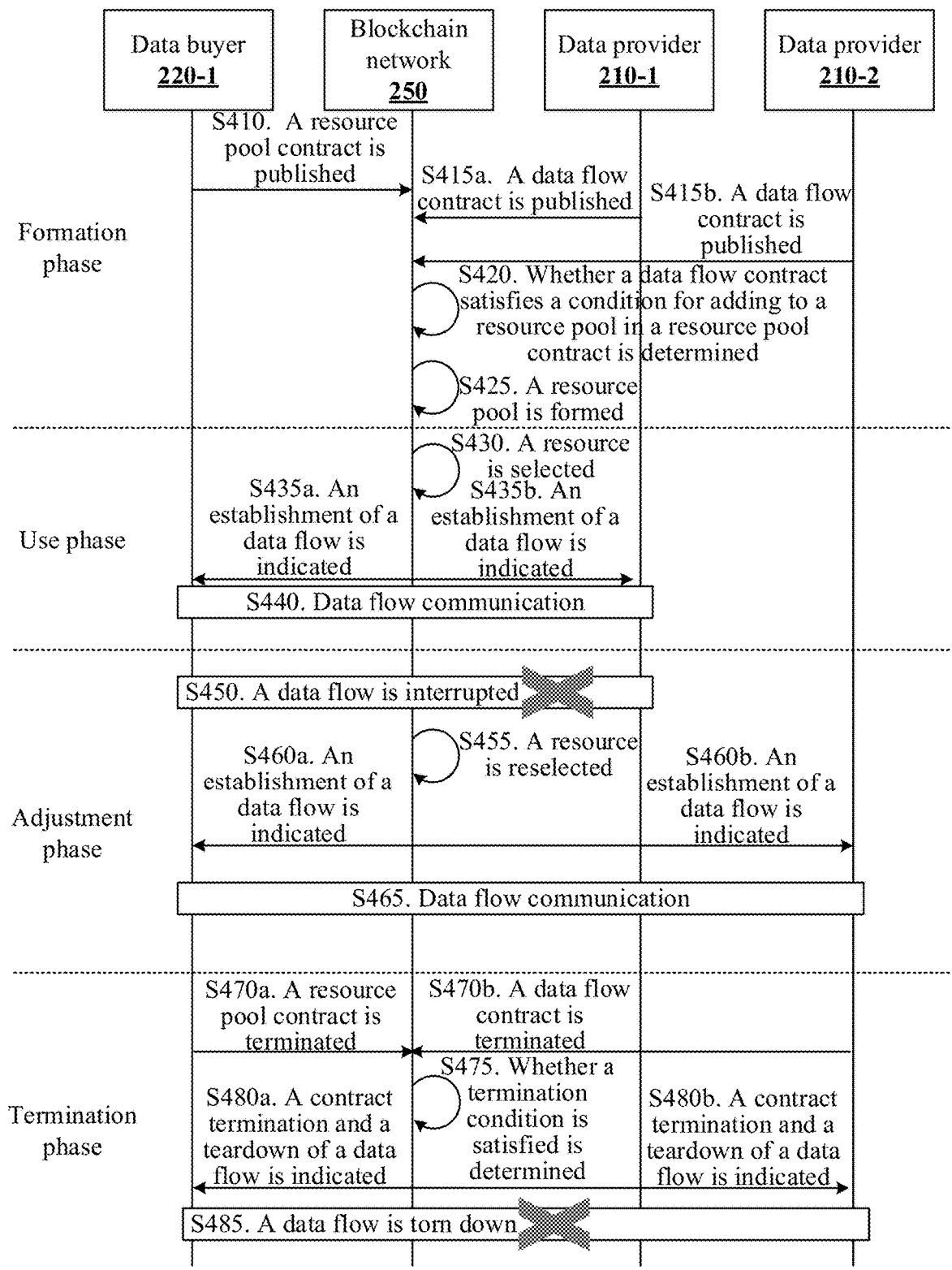
FIG. 4 is a schematic diagram illustrating a message flow of an example real-time data transaction process according to another embodiment of the present disclosure.

FIG. 4 is a schematic diagram illustrating a message flow of an example real-time data transaction process according to another embodiment of the present disclosure. Similar to FIG. 3, the method further exemplarily includes four phases, namely the formation phase, the use phase, the adjustment phase, and a termination phase. However, it should be noted that the phases do not necessarily appear in the order shown, but may be reversed. For example, the termination phase may occur before the adjustment phase or even before the use phase, thereby ensuring that the data buyer and/or the data provider has the right to terminate the transaction at any time subject to compliance of the smart contract. In addition, although the embodiment shown in FIG. 4 only involves the data buyer 220-1, the data provider 210-1, the data provider 210-2 and the blockchain network 250 in FIG. 2, the present disclosure is not limited thereto. This embodiment is only used to assist readers in understanding the technical content of the present disclosure. In other embodiments, it is possible to involve more data buyers and/or data providers.

Hereinafter, each phase shown in FIG. 4 will be described in detail with reference to FIG. 2.

The Formation Phase

At step S410, the data buyer 220-1 may publish the resource pool contract to the blockchain network 250. Similar to FIG. 3, the resource pool contract may be used to trigger the establishment of the resource pool (more specifically, a data flow contract pool, a data flow pool) including a first number (it is two in this example, but not limited to this) of resources (more specifically, the data flow). In some embodiments, the resource pool contract may include at least one of: a list for data flow contract identifier; a period for switching data flow contract; a method for adding data flow contract to the resource pool; and a method for selecting data flow contract. In other embodiments, the resource pool contract may additionally or alternatively include one or more of a current number of data flows and a current list for data flow. The method for adding data flow contract to the resource pool may include a condition or rule for adding to the data flow pool.

For example, the member variables and the member methods that may be included in the smart contract are shown in Table 2 below.

TABLE 2

Member table for another example resource pool contract

| Smart Contract Member | Description |
| --- | --- |
| Member Variable | Maximum number of data flow contracts<br>Rated number of data flow contracts<br>List for data flow contract identifier<br>Period for switching data flow contract (optional)<br>Current number of data flows<br>Current list for data flow |
| Member Method | Method for adding data flow contract to the resource pool( )<br>///include the rule for adding to the resource pool<br>Method for selecting data flow contract( ) ///update a list for data flow contract |

Unlike the member table shown in Table 1, the resource in Table 2 may be the "data flow contract" (or data flow) rather than the data provider. In other words, in the embodiment shown in FIG. 4, the resource pool to be established by the data buyer 220-1 is a resource pool for data flow, rather than the resource pool for the data provider. In addition, compared with the member methods in Table 1, the member methods in Table 2 do not have an establishment data flow method( ), because it may be implemented in the data flow contract provided by each data provider, such as the description below.

Similar to the embodiment shown in FIG. 3, in a case where the resource in the resource pool corresponds to the data flow contract (or the data flow), the data buyer (or the data receiver) may establish the data flow with the corresponding data provider (or the data transmitter). Such data providers correspond to the second number of data flow contracts (or data flows) in the resource pool.

At steps S415*a* and S415*b*, the data provider 210-1 and the data provider 210-2 may respectively publish their own data flow contract to the blockchain network 250. In some embodiments, the data flow contract may include at least one of: an identifier for the data flow contract; an identifier for the data provider; the price and/or pricing method for data flow; content information; the method for establishing data flow; and a method for adding to the data flow pool.

For example, the member variables and the member methods that may be included in the smart contract are shown in Table 3 below.

TABLE 3

Member table for an example data flow contract

| Smart Contract Member | Description |
| --- | --- |
| Member Variable | Identifier for data flow contract<br>Identifier for data provider (optional)<br>Price and/or pricing method for data flow<br>Content information |

TABLE 3-continued

Member table for an example data flow contract

| Smart Contract Member | Description |
|---|---|
| Member Method | Method for establishing data flow( ) |
| | Method for adding to the data flow pool( ) |

At step S420, the one or more nodes in the blockchain network 250 may respectively determine whether the data flow contracts published by the data provider 210-1 and the data provider 210-2 satisfy a condition for adding to the resource pool in the resource pool contract. For example, the "Method for adding data flow to the resource pool( )" of the resource pool contract (see Table 2) published by the data buyer 220-1 may invoke the "Method for adding to the data flow pool( )" (see Table 3) in the data flow contract published by the data provider 210-1 and/or 210-2, or vice versa (depending on the specific implementation of these two methods), to determine whether it may add to the resource pool.

In a case that the data flow contracts published by the data provider 210-1 and the data provider 210-2 satisfy the condition for adding to the resource pool in the resource pool contract, the one or more nodes in the blockchain network 250 may form the resource pool (or the data flow contract pool, the data flow pool) at step S425. In this example, the data flow contract pool may include the data flow contracts provided by the data providers 210-1 and 210-2.

In some embodiments, the condition or rule for adding to the resource pool may be related to the content, quality, price of the data provided by the data provider, or the reputation score of the data provider. For example, the condition or rule for adding to the resource pool may be: the content of the data flow satisfies relevant requirements or the price of the data flow is lower than a certain threshold, etc. In addition, similar to the embodiment shown in FIG. 3, when the resource pool is forming, the data flow contract of the data provider may actively request to add to the resource pool, or the blockchain network 250 may send the invitation to add to the resource pool to the data flow contract of the data provider that satisfies the rule for adding to the resource pool. In a case that the data flow contract agrees to add to the resource pool, the data flow contract is added to the resource pool by adding an identifier for the data flow contract to the list for data flow contract identifier in the resource pool contract. Furthermore, if the data flow contract that satisfies the rule for adding to the resource pool does not agree to add to the resource pool, the blockchain network 250 may find another data flow contract that satisfies the rule for adding to the resource pool and send it the invitation to add to the resource pool. This process may be repeated until the resource pool includes the first number of resources (i.e. the data flow contract) specified in the resource pool contract.

The Use Phase

At step S430, the one or more nodes in the blockchain network 250 may invoke the method for selecting data flow in the resource pool contract to select the second number of data flow contracts. In some embodiments, the second number may be less than the first number. In the embodiment shown in FIG. 4, the one or more nodes in the blockchain 250 may select the data flow contract provided by the data provider 210-1. In some embodiments, the method for selecting data flow may be, for example, the selection method based on the data quality, the selection method based on the data price, the selection method based on the reputation score of the data provider, and the like. In other embodiments, the method for selecting data flow may further be the random selection method.

In steps S435a and S435b, the one or more nodes in the blockchain 250 may respectively instruct the data buyer 220-1 and the data provider 210-1 to establish the data flow with each other. For example, the data flow between the two may be established by invoking the "Method for establishing data flow( )" in the data flow contract published by the data provider 210-1. Similar to the embodiment shown in FIG. 3, the data flow may be established through the blockchain network 250, or may be established directly between the two.

At step S440, the data buyer 220-1 may receive the real-time data from the data provider 210-1 through the established data flow and perform corresponding processing.

The Adjustment Phase

When the one or more nodes in the blockchain network 250 determine that a data flow switching condition is satisfied, the method for selecting data flow contract in the resource pool contract may be invoked to reselect the second number of data flow contracts. In some embodiments, the resource switching condition may be the period for switching resource. In another embodiment, the resource switching condition may be the data flow being interrupted. The data flow being interrupted may be caused by the equipment failure of the data provider.

In the embodiment of FIG. 4, at step S450, the one or more nodes in the blockchain network 250 or the data buyer 220-1 detect that the data flow is interrupted between the data buyer 220-1 and the data provider 210-1; for example, it is detected in the manner shown in FIG. 5 below. At step S455, the one or more nodes in the blockchain network 250 may reselect a data flow contract provided by the data provider (e.g., the data provider 210-2) according to the "Method for selecting data flow contract( )".

Next, similar to steps S435a and S435b, at steps S460a and/or S460b, the one or more nodes in the blockchain 250 may respectively instruct the data buyer 220-1 and data provider 210-2 to establish the data flow with each other, or instruct one of the parties to establish the data flow with the other.

At step S465, the data buyer 220-1 may receive the real-time data from the reselected data provider 210-2 through the new established data flow.

The Termination Phase

At steps S470a and S470b, the data buyer 220-1 and/or the data provider 210-2 may send the request to the blockchain network 250 for resource pool contract termination. For example, in some embodiments, when the data provider 210-2 needs to shut down for maintenance, it may consider temporarily withdrawing from the resource pool, and thus may initiate the resource pool contract termination at the step S470b. In other embodiments, when the data buyer 220-1 may need to temporarily maintain the equipment, it may further initiate the resource pool contract termination. These resource pool contract termination requests should not violate relevant regulations that may exist in the previously published resource pool contract and/or data flow contract, such as the period of the resource pool contract, a period of the data flow contract etc. In addition, in some embodiments, after the data buyer 220-1 obtains required data, it may further initiate the resource pool contract termination.

Subsequent steps shown in FIG. 4 are generally similar to the corresponding steps shown in FIG. 3, and thus will not be repeated.

According to the embodiment of FIG. 3 or FIG. 4, when the one or more nodes in the blockchain network 250 determine that the resource switching condition is satisfied, a method for selecting resource (for example, the method for selecting data provider in Table 1 or the method for selecting data flow contract in Table 2) in the resource pool contract may be invoked to reselect the second number of resources, the resource switching condition may be the data flow being interrupted or a period.

In the data transaction, the data flow provided by the data provider to the data buyer usually includes information such as a timestamp, the identifier for the data provider, etc., in addition to the content information. Whether the data flow is interrupted or not may be determined according to the information of the data flow detected at different times.

Figure 5:
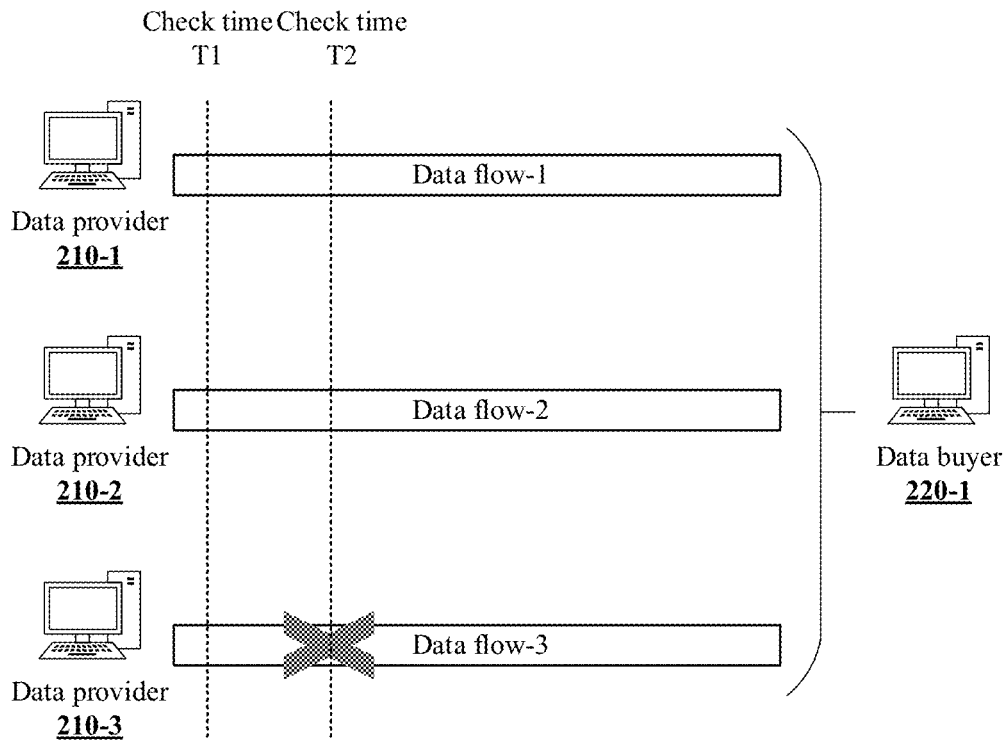
FIG. 5 is a schematic diagram illustrating a detection of data flow interruption according to an embodiment of the present disclosure.

FIG. 5 is a schematic diagram illustrating a detection of data flow interruption according to an embodiment of the present disclosure. In the embodiment of FIG. 5, the one or more nodes in the blockchain network (e.g., the blockchain network 250) may determine whether the data is the real-time data and/or whether the data flow is interrupted by determining the timestamps and/or data provider identifiers in the data flow acquired at a check time T1 and a check time T2. For example, at the check time T1, the one or more nodes in the blockchain network or the data buyer 220-1 may determine that there are currently three data providers 210-1 to 210-3 providing data to the data buyer 220-1 according to the identifiers for the data providers in the data flows. At the check time T2, the one or more nodes in the blockchain network or the data buyer 220-1 may determine that there are currently two data providers 210-1 and 210-2 providing data to the data buyer 220-1 according to the identifiers for the data providers in the data flows. By comparing the data flows acquired at the check times T1 and T2, the one or more nodes in the blockchain network or the data buyer 220-1 may determine that the data provider 210-3 fails to provide data to the data buyer 220-1 at the check time T2, thereby determining that the data flow may be interrupted between the data provider 210-3 and the data buyer 220-1.

Figure 6:
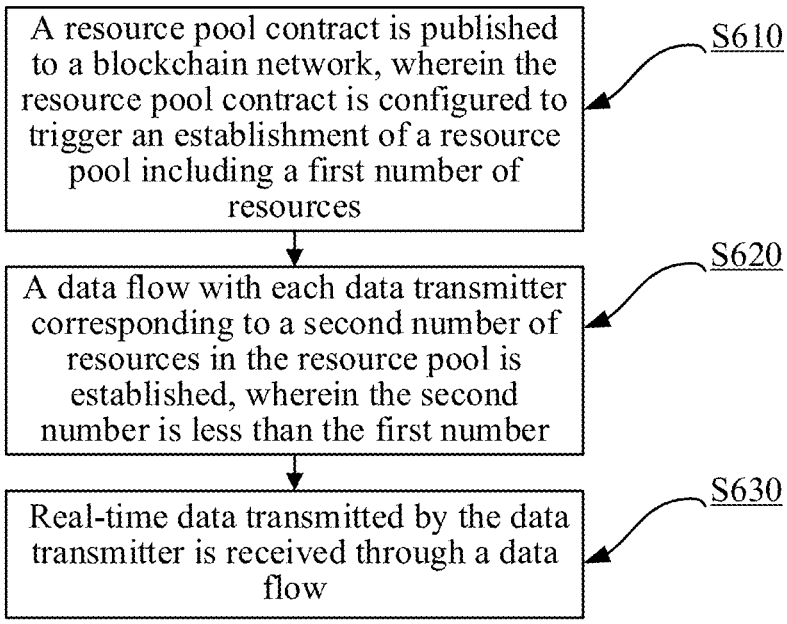
FIG. 6 is a flowchart illustrating an example method executed in an electronic device of a data receiver according to an embodiment of the present disclosure.

FIG. 6 is a flowchart illustrating a method 600 executed in an electronic device of the data receiver according to an embodiment of the present disclosure.

The method 600 may include: at step S610, publishing the resource pool contract to the blockchain network, wherein the resource pool contract is used to trigger the establishment of a resource pool including the first number of resources.

The method 600 may further include: at step S620, establishing the data flow with each data provider corresponding to the second number of resources in the resource pool, wherein the second number is less than the first number.

The method 600 may further include: at step S630, receiving real-time data transmitted by the data provider through the data flow.

In some embodiments, the resource pool contract includes the method for selecting resource. The method for selecting resource is used to be invoked in response to the one or more nodes in the blockchain network determining that the resource switching condition is satisfied, so that the data buyer establishes the data flow with each data provider corresponding to the second number of resources. In some embodiments, the method for selecting resource is further invoked by the one or more nodes in the blockchain network to select, from the resource pool, a resource other than a resource for which a corresponding data flow established with the data receiver exists currently, so that the data receiver establish a new data flow with a data provider corresponding to the selected resource. In some embodiments, the resource switching condition includes one or more of: the period for switching resource; and the data flow being interrupted. In some embodiments, the resource pool contract includes the method for adding resource to the resource pool. The method for adding resource to the resource pool includes the rule for adding resource to the resource pool. The method for adding resource to the resource pool is used to trigger one or more nodes in the blockchain network to add a resource to the resource pool in response to determining that the resource satisfies the rule for adding resource to the resource pool. In some embodiments, the resource in the resource pool is at least one of the data provider or the data flow contract. In the case where the resource is the data provider, the resource pool contract may further include at least one of: the list for data provider identifier; the period for switching data provider; the price and/or pricing method for data flow; the method for adding data provider to the resource pool; the method for selecting data provider; and the method for establishing data flow. In the case where the resource is the data flow contract, the resource pool contract may further include at least one of: the list for data flow contract identifier; the period for switching data flow contract; the method for adding data flow to the resource pool; and the method for select data flow contract. In the case where the resource is the data flow contract, the step S620 may include: executing the method for establishing data flow in the resource pool contract to establish a data flow with at least one data transmitter corresponding to no more than the second number of resources, or executing the method for selecting data flow contract in the resource pool contract to trigger no more than the second number of data flow contracts, so as to establish a data flow with at least one data transmitter corresponding to the second number of data flow contracts in the resource pool.

FIG. 7 is a flowchart illustrating a method 700 executed in an electronic device of the data transmitter according to an embodiment of the present disclosure.

The method 700 may include: at step S710, receiving the resource pool contract from the blockchain network, wherein the resource pool contract is used to trigger the establishment of the resource pool including the first number of resources. The resource pool contract may further include the parameter indicating the second number of resources expected to be activated simultaneously in the resource pool, and the second number is less than the first number.

The method 700 may further include: at step S720, transmitting the message, which indicates consent to be added to the resource pool, to the blockchain network.

In some embodiments, the method 700 may further include: establishing, under the coordination of the blockchain network executing the resource pool contract, the data flow with the data buyer publishing the resource pool contract; and transmitting real-time data to the corresponding data buyer through the established data flow.

FIG. 8 is a flowchart illustrating another method 800 executed in the electronic device of the data transmitter according to an embodiment of the present disclosure.

The method 800 may include: at step S810, publishing the data flow contract to the blockchain network, wherein the data flow contract is used to trigger to add the data flow provided by the data provider to the resource pool as the resource. The resource pool is the resource pool including the first number of resources, and the establishment of the resource pool is triggered by the resource pool contract published by the data provider. The resource pool contract may further include the parameter indicating the second number of resources expected to be activated simultaneously in the resource pool, and the second number is less than the first number.

The method 800 may further include: receiving the message, which indicates that the data flow contract is added to the resource pool, from the blockchain network. In some embodiments, the method 800 may further include: establishing, under the coordination of the blockchain network executing the resource pool contract, the data flow with the data buyer publishing the resource pool contract; and transmitting real-time data to the corresponding data buyer through the established data flow. In some embodiments, the data flow contract may include at least one of: the identifier for the data flow contract; the identifier for the data transmitter; the price and/or pricing method for the data flow; the content information; the method for establishing the data flow; and the method for adding to the resource pool.

Figure 9:
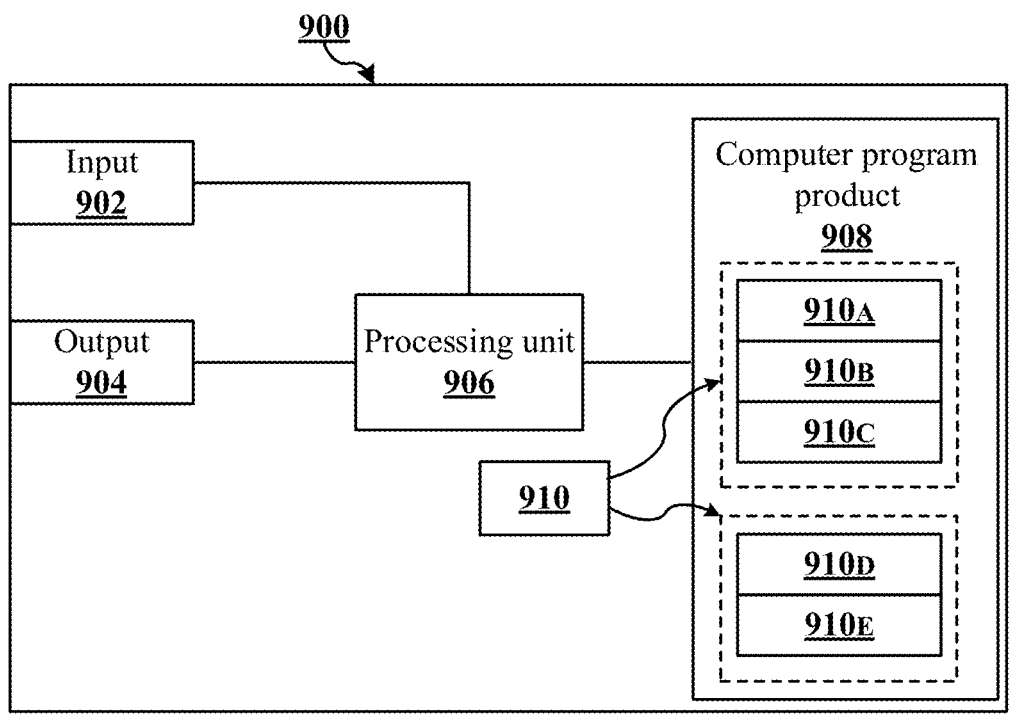
FIG. 9 is a schematic hardware layout diagram illustrating a device for real-time data communication according to an embodiment of the present disclosure.

FIG. 9 is a schematic layout diagram illustrating a hardware of an electronic device 900 (e.g. any one of the data provider 210 and the data buyer 220 shown in FIG. 2 to FIG. 5) for real-time data communication according to an embodiment of the present disclosure. A hardware layout 900 may include a processor or a controller 906 (e.g., a digital signal processor (DSP), a central processing unit (CPU), etc.). The processor 906 may be a single processing unit or multiple processing units for executing different actions of the processes described herein. The layout 900 may further include an input unit 902 used to receive signals from other entities, and an output unit 904 used to provide signals to other entities. The input unit 902 and the output unit 904 may be arranged as a single entity or as separate entities.

In addition, the layout 900 may include at least one readable storage medium 908 in a form of non-volatile or volatile memory, such as an electrically erasable programmable read only memory (EEPROM), a flash memory, and/or a hard drive. The readable storage medium 908 includes a computer program 910. The computer program 910 includes code/computer readable instructions which, when executed by the processor 906 in the layout 900, cause the hardware layout 900 and/or a device including the hardware layout 900 to perform e.g. the processes described above in conjunction with FIG. 3 to FIG. 5 and any variations thereof.

The computer program 910 may be configured as a computer program code having, for example, the architecture of computer program modules 910A to 910C. Thus, in an example embodiment such as when the hardware layout 900 is used in the data buyer 220, the code in the computer program of the layout 900 may include: the module 910A used to publish the resource pool contract to the blockchain network, the resource pool contract is used to trigger the establishment of the resource pool including the first number of resources; the module 910B used to establish the data flow with the data transmitter corresponding to the second number of resources in the resource pool, wherein the second number is less than the first number; and the module 910C used to receive real-time data transmitted by the data transmitter through the data flow.

In addition, in an example embodiment such as when the hardware layout 900 is used in the data provider 210, the code in the computer program of the layout 900 may include: a module 910D used to receive the resource pool contract from the blockchain network, the resource pool contract is used to trigger the establishment of a resource pool including the first number of resources, the resource pool contract further includes the parameter indicating the second number of resources expected to be activated simultaneously in the resource pool, and the second number is less than the first number; and a module 910E used to transmit the message, which indicates consent to be added to the resource pool, to the blockchain network.

In addition, in other embodiments, in the example embodiment such as when the hardware layout 900 is used in the data provider 210, the code in the computer program of the layout 900 may include: the module 910D used to publish the data flow contract to the blockchain network, wherein the data flow contract is used to trigger to add the data flow provided by the data provider to the resource pool as the resource, the resource pool is the resource pool including the first number of resources, the establishment of the resource pool is triggered by the resource pool contract published by the data receiver, the resource pool contract further includes the parameter indicating the second number of resources expected to be activated simultaneously in the resource pool, and the second number is less than the first number; and the module 910E used to receive the message, which indicates that the data flow contract is added to the resource pool, from the blockchain network.

The computer program modules may substantially perform each of the actions in the flows shown in FIG. 3 to FIG. 5 to simulate the data provider 210 and/or the data buyer 220. In other words, when different computer program modules are executed in the processor or controller 906, they may correspond to different units or modules in the simulated data provider 210 and/or the data buyer 220.

Although the code means in the embodiments disclosed above in conjunction with FIG. 9 are implemented as computer program modules which, when executed in the processor 906, cause the hardware layout 900 to perform the actions described above in conjunction with FIG. 3 to FIG. 5, at least one of the code means may be implemented at least in part as a hardware circuit in an alternative embodiment.

The processor may be a single CPU (Central Processing Unit), but may further include two or more processing units. For example, the processor may include a general-purpose microprocessor, an instruction-set processor, and/or a related chipset and/or a special-purpose microprocessor (e.g., an application-specific integrated circuit (ASIC)). The processor may further include an onboard memory for caching purposes. The computer program may be carried by a computer program product connected to the processor. The computer program product may include a computer-readable medium having the computer program stored thereon. For example, the computer program product may be the flash memory, a random access memory (RAM), a read only memory (ROM), and an EEPROM. The computer program modules described above may be distributed in different computer program products in a form of the memory within the electronic device in the alternative embodiment.

The present disclosure has thus far been described in conjunction with the preferred embodiments. It should be understood that various other changes, substitutions and additions may be made by those skilled in the art without departing from the spirit and scope of the present disclosure. Therefore, the scope of the present disclosure should not be limited to the specific embodiments described above, but should be defined by the appended claims.

What is claimed is:

1. A method for real-time data communication executed at an electronic device of a data receiver, comprising:
   publishing a resource pool contract to a blockchain network, wherein the resource pool contract is configured to trigger an establishment of a resource pool comprising a first number of resources;
   establishing a data flow with at least one data transmitter corresponding to a second number of resources in the resource pool, wherein the second number is less than the first number; and
   receiving real-time data transmitted by the at least one data transmitter through the data flow,
   wherein the resource pool contract comprises a method for selecting a resource, and the method for selecting a resource is configured to be invoked in response to one or more nodes in the blockchain network determining that a resource switching condition is satisfied, so that the data receiver establishes the data flow with each of the at least one data transmitter corresponding to the second number of resources in the resource pool;
   wherein the method for selecting a resource is further invoked by the one or more nodes in the blockchain network to select, from the resource pool, a resource other than a resource for which a corresponding data flow established with the data receiver exists currently, so that the data receiver establishes a new data flow with a data provider corresponding to the selected resource; and
   wherein the resource switching condition comprises a data flow being interrupted.

2. The method according to claim 1, wherein the resource switching condition further comprises:
   a period for switching resource.

3. The method according to claim 1,
   wherein the resource pool contract comprises a method for adding resources to the resource pool, and the method for adding resources to the resource pool comprises a rule for adding resources to the resource pool, and
   wherein the method for adding resource to the resource pool is configured to trigger one or more nodes in the blockchain network to add a resource to the resource pool in response to determining that the resource satisfies the rule for adding resource to the resource pool.

4. The method of claim 1, wherein the resource in the resource pool is at least one of the data transmitter or a data flow contract.

5. The method according to claim 4, wherein the resource is the data transmitter, and the resource pool contract further comprises at least one of:
   a list for data transmitter identifiers;
   a period for switching data transmitters;
   a price and/or pricing method for data flow;
   a method for adding a data transmitter to the resource pool;
   a method for selecting a data transmitter; or
   a method for establishing data flow.

6. The method according to claim 5, wherein the establishing a data flow with at least one data transmitter corresponding to a second number of resources in the resource pool comprises:
   executing the method for establishing data flow in the resource pool contract to establish the data flow with at least one of the at least one data transmitter corresponding to no more than the second number of resources.

7. The method according to claim 4, wherein the resource is the data flow contract, and the resource pool contract further comprises at least one of:
   a list for data flow contract identifiers;
   a period for switching data flow contracts;
   a method for adding a data flow contract to the resource pool; or
   a method for selecting a data flow contract.

8. A first electronic device used at a data receiver, comprising:
   a processor; and
   a memory storing instructions, wherein the instructions, when executed by the processor, cause the first electronic device to implement the method according to claim 1.

9. A method for real-time data communication executed at an electronic device of a data transmitter, comprising:
   receiving a resource pool contract from a blockchain network, wherein the resource pool contract is configured to trigger an establishment of a resource pool comprising a first number of resources, the resource pool contract further comprises a parameter indicating a second number of resources expected to be activated simultaneously in the resource pool, and the second number is less than the first number; and
   transmitting a message, which indicates consent to be added to the resource pool, to the blockchain network,
   wherein the resource pool contract is published by using the method of claim 1.

10. The method according to claim 9, further comprising:
    establishing, under a coordination of the blockchain network executing the resource pool contract, a data flow with a data receiver publishing the resource pool contract; and
    transmitting real-time data to the data receiver through the established data flow.

11. A second electronic device used at a data transmitter, comprising:
    a processor; and
    a memory storing instructions, wherein the instructions, when executed by the processor, cause the second electronic device to implement the method according to claim 9.

12. A method for real-time data communication executed at an electronic device of a data transmitter, comprising:
    publishing a data flow contract to a blockchain network, wherein the data flow contract is configured to trigger to add a data flow provided by a data provider to a resource pool as a resource, the resource pool comprises a first number of resources, an establishment of the resource pool is triggered by a resource pool contract published by a data receiver, the resource pool contract further comprises a parameter indicating a second number of resources expected to be activated simultaneously in the resource pool, and the second number is less than the first number;
    receiving a message, which indicates that the data flow contract is added to the resource pool, from the blockchain network;
    establishing, under a coordination of the blockchain network executing the resource pool contract, a data flow with the data receiver publishing the resource pool contract; and transmitting real-time data to the data receiver through the established data flow, wherein the resource pool contract comprises a method for selecting a resource, and the method for selecting a resource is configured to be invoked in response to one or more nodes in the blockchain network determining that a resource switching condition is satisfied, so that the data receiver establishes the data flow with each of the at least one data transmitter corresponding to the second number of resources in the resource pool;

wherein the method for selecting a resource is further invoked by the one or more nodes in the blockchain network to select, from the resource pool, a resource other than a resource for which a corresponding data flow established with the data receiver exists currently, so that the data receiver establishes a new data flow with a data provider corresponding to the selected resource; and wherein the resource switching condition comprises a data flow being interrupted.

13. The method according to claim 12, wherein the data flow contract comprises at least one of:
an identifier for the data flow contract;
an identifier for the data transmitter;
a price and/or pricing method for the data flow;
a content information;
a method for establishing the data flow; or
a method for adding to the resource pool.

14. A second electronic device used at a data transmitter, comprising:
a processor; and
a memory storing instructions, wherein the instructions, when executed by the processor, cause the second electronic device to implement the method according to claim 12.

15. A system for real-time data communication, comprising:
a blockchain network;
a first electronic device communicatively coupled to the blockchain network and comprising:
a first processor; and
a first memory storing instructions, wherein the instructions, when executed by the first processor, cause the first electronic device to:
publish a resource pool contract to the blockchain network, wherein the resource pool contract is configured to trigger an establishment of a resource pool comprising a first number of resources;
establish a data flow with at least one data transmitter corresponding to a second number of resources in the resource pool, wherein the second number is less than the first number; and
receive real-time data transmitted by the data transmitter through the data flow;
one or more second electronic devices, wherein each second electronic device is communicatively coupled to the blockchain network and comprises:
a second processor; and
a second memory storing instructions, wherein the instructions, when executed by a corresponding second processor, cause a corresponding second electronic device to:
receive the resource pool contract from the blockchain network; and transmit a message, which indicates consent to be added to the resource pool, to the blockchain network, or
publish a data flow contract to the blockchain network, wherein the data flow contract is configured to trigger to add a data flow provided by the data provider to the resource pool as a resource; and receive a message, which indicates that the data flow contract is added to the resource pool, from the blockchain network,
wherein the resource pool contract comprises a method for selecting a resource, and the method for selecting a resource is configured to be invoked in response to one or more nodes in the blockchain network determining that a resource switching condition is satisfied, so that the data receiver establishes the data flow with each of the at least one data transmitter corresponding to the second number of resources in the resource pool;
wherein the method for selecting a resource is further invoked by the one or more nodes in the blockchain network to select, from the resource pool, a resource other than a resource for which a corresponding data flow established with the data receiver exists currently, so that the data receiver establishes a new data flow with a data provider corresponding to the selected resource; and
wherein the resource switching condition comprises a data flow being interrupted.

* * * * *